Oct. 17, 1967     W. E. HOWDEN     3,348,117

CELL ANTI-REVERSAL PROTECTION NETWORK

Filed Oct. 28, 1964

INVENTOR
W. E. HOWDEN
BY John P. McDonnell
ATTORNEY

United States Patent Office 3,348,117
Patented Oct. 17, 1967

3,348,117
CELL ANTI-REVERSAL PROTECTION NETWORK
William E. Howden, Summit, N.J., assignor to Bell Telephone Laboratories, Incorporated, New York, N.Y., a corporation of New York
Filed Oct. 28, 1964, Ser. No. 407,034
6 Claims. (Cl. 320—18)

ABSTRACT OF THE DISCLOSURE

A storage cell protection network wherein either a normally saturated transistor or diode is serially connected with the cell to be protected and a bypass diode is connected across both the cell to be protected and the serially connected device whereby the protected cell is bypassed and removed from a series string of cells prior to the polarity reversal that precedes overdischarge destruction of the cell.

Figure 1:
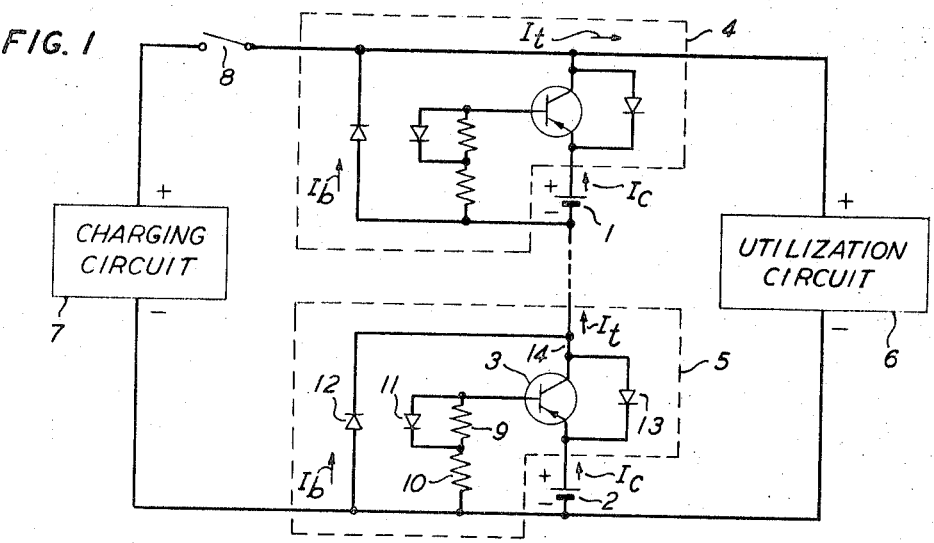

This invention relates to storage cell protection networks and more particularly to protection networks, that prevent storage cell polarity reversal and destruction.

Storage cells are usually connected to a passive utilization circuit in a series string as, for example, the cells in a battery which is connected to supply a load or a number of cells connected, for testing purposes, to a constant discharge rate network. In a series string of cells, one cell will normally discharge the energy stored therein before the remaining cells in the string have discharged. The remaining cells in the string, which still have energy stored therein, force the discharged cell to continue to carry current to the utilization circuit, however, and the polarity of the potential appearing across the discharged cell reverses. Unless protective measures are taken, cell destruction normally follows the polarity reversal.

The manner in which cell destruction occurs can be seen, for example, in the case of the nickel-cadmium cell wherein the reaction that takes place at the positive electrode during normal discharge is

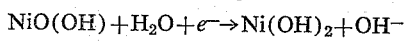

If, as discussed, the nickel-cadmium cell is connected in a series string with other cells, one cell will usually discharge the energy stored therein before the others, the remaining cells in the series string force the discharged cell to continue to carry current, the potential across the discharged cell reverses, all the positive electrode NiO(OH) is converted to Ni(OH)$_2$, and the following overdischarge reaction takes place at the positive electrode of the cell:

$$2H_2O + 2e^- \rightarrow 2OH^- + H_2$$

(The reactions at the negative electrode are

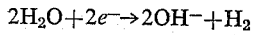

during discharge and  during overdischarge.) As can be seen from the overdischarge reaction at the positive electrode, free hydrogen gas will normally be liberated following the forced current and polarity reversal conditions. Before the cell can again be put in service, therefore, the hydrogen gas must be pumped from the cell and the relative charge states of the electrodes reset. In the case of the sealed cell, the pressure of the hydrogen gas often becomes sufficient to burst, and hence destroy, the cell.

There is at present no known satisfactory way of preventing hydrogen evolution during overdischarge; hence, precautions must be taken to prevent overdischarge. Somewhat restrictively, however, if the cell discharge is terminated too far inadvance of cell polarity reversal, the use of the cell is inefficient and may result in a loss of cell capacity.

The overdischarge prevention measures of prior art have been limited to hand monitoring and individual sensing circuits. Since cells, such as nickel-cadmium cells, are, as discussed, often used with a number of cells in series, hand monitoring is inconvenient, inefficient, and expensive. The use of individual sensing circuits is also inefficient since each sensing circuit requires its own power supply. One relatively complex sensing circuit could be used to monitor a series of cells but a single sensing circuit failure would then result in the destruction of a string of cells.

Simple semiconductor device attempts at solving the problem depend upon the polarity reversal, which precedes the overdischarge process, to activate the elements that remove the cell from the circuit. Since the polarity reversal must occur before the cell is removed from the circuit, these circuits do not completely overcome the adverse effects of overdischarge, although some small benefit may be obtained. These circuits have, moreover, also proved to be unsatisfactory due to their relative lack of sensitivity and hence reliability in removing the cell from the circuit before the overdischarge process is begun.

It is, therefore, an object of this invention to provide an automatic, inexpensive, and efficient cell protection network that reliably prevents overdischarge of a cell in a series string of cells.

The present invention is a cell protection network comprising a sensing transistor and a bypass diode connected with each cell in a series string of cells. The emitter-base path of the protection network transistor is connected across the cell to be protected to bias the transistor normally conductive in the low-power loss saturated condition. The emitter-collector path of the transistor is serially connected with the remaining cells and their associated protection networks in the series string. The bypass diode, which is normally nonconductive, is connected in parallel with both the emitter-collector path of the transistor and the cell to be protected to provide a bypass path around the cell and the transistor as the impedance of the emitter-collector path of the transistor increases due to the decreasing bias provided by the discharging cell which is to be protected. At a point prior to the polarity reversal of the cell, the bias supplied to the transistor by the cell decreases such that the transistor is biased out of conduction (i.e., the emiter-collector impedance increases to a relatively infinite value prior to cell overdischarge) and the cell is effectively removed from the series string. Since the process by which the cell is phased out of the circuit and the bypass circuit is phased in is gradual, protection is achieved without interfering with the normal operation of the associated circuitry. In a second embodiment of the invention an individual diode, which is preferably of a different semiconductor material than the bypass diode, is serially connected with each cell in the series string of cells to protect each cell against overdischarge in a manner similar to the transistor protection network.

Figure 2:
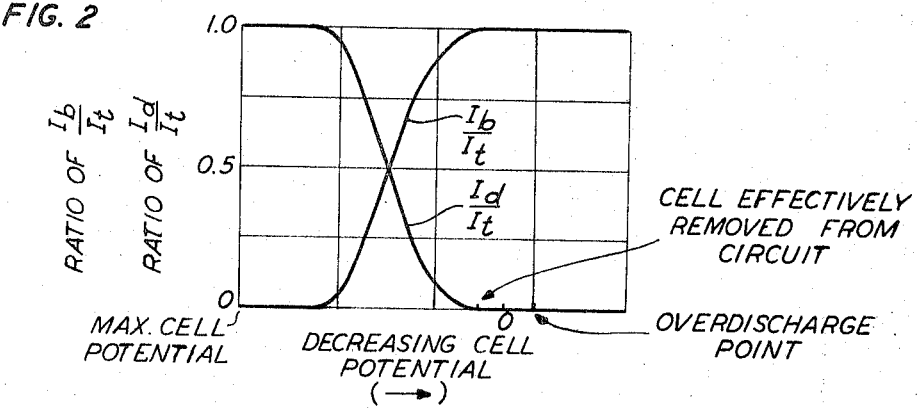

Other objects and features of the present invention will become apparent upon consideration of the following detailed description when taken in connection with the accompanying drawing in which:

FIG. 1 is one embodiment of the invention;

FIG. 2 graphically illustrates the operation of the invention; and

Figure 3:
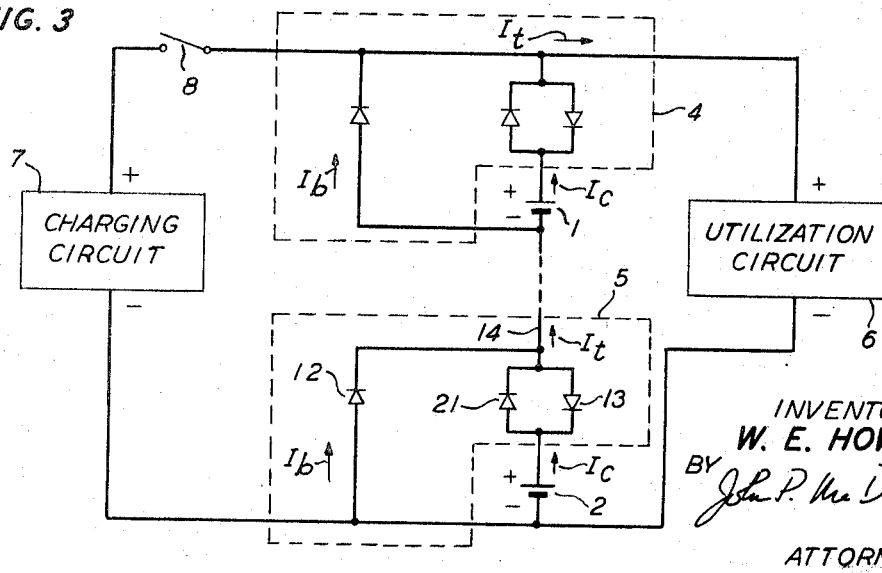

FIG. 3 is a second embodiment of the invention.

As can be seen from FIG. 1 of the drawing, a string of cells, as represented by cells 1 and 2, is serially connected with the emitter-collector paths of transistors 3 in protection units 4 and 5. Since the protection units 4 and 5 are identical, numerical designations have been given only to components in the protection unit 5. A series of cells (as represented by the broken line in the drawing), such as 1 and 2, and their associated protection networks, such as 4 and 5, are thus serially connected with a utilization circuit 6. Only two cells and associated protection networks are shown in the drawing for ease of illustration. A charging circuit 7 is serially connected through a single-pole single-throw switch 8 to charge each of the cells in the series string.

In each of the protection units 4 and 5, resistors 9 and 10 are serially connected from the negative terminal of the cell to be protected to the base electrode of pnp transistor 3. Diode 11 is shunted across resistor 9 in the forward conductivity direction from the base of transistor 3 to resistor 10. Diode 12 is connected in the forward conductivity direction from the negative terminal of the cell to be protected (either 1 or 2) to the collector electrode of transistor 3. Diode 13 is shunted in the forward conductivity direction from the collector electrode of transistor 3 to the common terminal of the emitter electrode of transistor 3 and the positive terminal of the cell to be protected.

The cell to be protected, which in FIG. 1 is either 1 or 2, normally supplies sufficient current through the emitter-base path of transistor 3 and the bias level resistors 9 and 10 and diode 11 to bias the emitter-collector path of transistor 3 into conduction. When the cell to be protected is at or close to full charge, transistor 3 is normally conductive in saturation. Since the transistor 3 is normally in saturation, both the emitter-collector and emitter-base path voltage drops are relatively negligible and only a relatively very small power loss is attributable to the protection circuit. (The current flow in the emitter-base path of the transistor 3 is sufficiently small so that only relatively small power losses occur in resistive components in this network.) Protection is thus provided with only minimum effect on the over-all efficiency of the circuit. It should perhaps be noted at this point that although resistors 9 and 10 and diode 11 are illustrated to provide a temperature stabilized bias path for the transistor 3 in the preferable embodiment of FIG. 1, a single resistor or other well known compatible circuit element could be connected from the base electrode of transistor 3 to the negative terminal of the cell to be protected if a temperature stabilized bias path was not desired.

The forward conductivity voltage across diode 12 is easily calculated by summing the potentials in the loop from which the following equation is obtained:

$$V_{d12} = V_{ec} - V_c$$

where $V_{d12}$ is the forward voltage drop across diode 12, $V_{ec}$ is the voltage drop across the emitter-collector path of transistor 3, and $V_c$ is the potential across the cell to be protected, which in FIG. 1 is either cell 1 or 2. As noted heretofore, when the potential across a cell is at or close to a full charge, transistor 3 is in saturation and the voltage drop across the emitter-collector path of the transistor is practically zero. From the foregoing equation, therefore, it is easily seen that for this full charge condition practically all the potential of the cell will appear as an inverse potential (i.e., a negative potential with respect to the forward conductivity direction) across diode 12 and hence this diode will not be conductive.

As the cell begins to discharge, however, the magnitude of the current flow in the emitter-base path of transistor 3 begins to decrease, transistor 3 comes out of saturation, and the voltage drop across the emitter-collector path of transistor 3 increases (as the emitter-base bias is reduced the emitter-collector impedance increases) until transistor 3 ceases to conduct and its emitter-collector path appears as a relatively infinite impedance, i.e., essentially an open circuit. Since the emitter-collector path of transistor 3 is serially connected with a series of other cells and the utilization circuit 6, a progressively larger portion of the voltage in the loop will appear across the increased impedance, and as can be seen from the foregoing equation, diode 12 will be forward biased into conduction to bypass both the cell to be protected and the associated protection transistor 3.

It should be noted that if transistor 3 were to cease to conduct before diode 12 was biased into conduction, a momentary and undesirable voltage transient would appear across the utilization circuit 6. This condition will never occur in the present circuit, however, since once the voltage drop across the emitter-collector path of transistor 3 exceeds the potential remaining in the cell to be protected by a value equal to the forward threshold voltage of diode 12, the diode 12 will be biased into conduction and the bypassing cell protection process is begun. Actually, the magnitude of the current bypassed by the diode 12 will at first be only a small portion of the current appearing at the point 14 but as the cell begins to discharge even further, the emitter-base bias current of transistor 3 decreases further, until finally the emitter-collector path of the transistor appears as an open circuit and all the current appearing at point 14 will have passed through the diode 12. Since the diode 12 is conductive prior to the cessation of conduction through transistor 3, no transient voltages are generated.

The protection process is thus a gradual one in which a diode 12 is gradually biased into conduction so as to prevent overdischarge of the cell. The sequence prior to the overdischarge point is, therefore, as follows: the bias supplied to transistor 3 decreases so that its emitter-collector path appears as a progessively larger impedance, diode 12 is biased into a conduction to begin the bypass process, transistor 3 is ultimately biased out of conduction, whereupon the cell to be protected is electrically isolated from the series string of cells, and diode 12 bypasses the cell and the protective transistor 3 so that the remaining cells continue to supply the utilization circuit 6 without interruption. Since the transistor 3 is basically a switch, inexpensive transistors rejected for other applications, e.g., for low gain, may be employed for this purpose. The simplicity of the over-all protection circuit, and the relatively inexpensive components employed therein, make the circuit attractive for most practical battery cell protection applications. Diode 13 provides a charging path from the charging source 7 for the cell associated with each of the protection networks when the charging path switch 8 is thrown.

The foregoing operation and features of the protection circuit are perhaps best summarized by referring to FIG. 2. In FIG. 2, the abscissa represents decreasing cell voltage, i.e., the maximum value of cell voltage is plotted at the origin with the scale of the abscissa descreasing from this point. The ordinate is plotted to represent the ratio of the cell current, represented by $I_c$ in FIG. 1, to the output or total current, represented by $I_t$ in FIG. 1 as the current appearing at the output point 14 of each of the protection units. The ordinate is also plotted to represent the ratio of the current through the bypass diode 12, represented by $I_b$ in FIG. 1, to that of the total output current of the protection unit, $I_t$.

As can be seen from FIG. 2, all of the current $I_t$ flows from the cell through the emitter-collector path of the saturated transistor 3 associated with the cell when the cell voltage is at or close to its maximum or full charge value. As time goes on, however, the cell begins to discharge and the potential of the cell begins to decrease from the maximum or full charge value so that the current output of the cell, which supplies the emitter-base bias to the protection transistor, causes the emitter-colletcor path of the transistor to be biased out of saturation and ino the variable impedance mode, as discussed heretofore. At a point in the cycle during which the emitter-collector path of the transistor acts as a variable impedance, diode 12 is biased into conduction and a portion of the total current $I_t$ flows through this diode, as shown by $I_b/I_t$ curve in FIG. 2. As the cell voltage continues to decrease, the ratio $I_c/I_t$ of the current decreases until the cell is effectively removed from the circuit by the protective transistor and $I_c$, and hence the ratio $I_c/I_t$, equal zero. As $I_c$ decreases, $I_b$ increases and when $I_c/I_t=0$, $I_b/I_t=1$, i.e., all the current $I_t$ now flows through the bypass diode 12 of the protective unit. As can be seen from FIG. 2, the cell is effectively removed from the circuit before the potential of the cell has decreased to the polarity reversal overdischarge point.

The circuit of FIG. 3 is similar to the circuit of FIG. 1 and like numerical designations are retained for the components of FIG. 1. In place of the emitter-collector path of transistor 3, a diode 21, poled in the forward conductivity direction of the emitter-collector path of transistor 3, is connected. Since a transistor is no longer required, the transistor emitter-base biasing network comprising transistors 9 and 10 and diode 11 has been eliminated. The remaining structure of the circuit of FIG. 3 is basically the same as that of FIG. 1.

In FIG. 3, diode 21 is normally forward biased by the cell associated with the protection network, i.e., the cell to be protected. When the voltage across the cell begins to decrease to a potential less than the forward threshold voltage of the diode 21, however, the diode ceases to conduct and the cell will be removed from the circuit before the overdischarge point is reached. If diode 12 is preferably made of a different semiconductor material with a lower forward threshold voltage than diode 21, this diode will be biased into conduction before diode 21 is biased out of conduction and hence will bypass current in the manner discussed in connection with FIG. 2 before conduction through diode 21 is terminated so that the cell can be removed from the circuit without a sharp reduction of potential across the utilization circuit 6, as discussed heretofore. Diode 13 provides a charging path from the charging source 7 for the cell associated with the protection network when the charging path switch 8 is thrown.

The above described arrangement is illustrative of the principles of the invention. Other embodiments may be devised by those skilled in the art without departing from the spirit and scope of the invention.

What is claimed is:

1. A plurality of cell protection networks serially connected with a plurality of serially connected cells and a utilization circuit, each of said cells being subject to overdischarge destruction when the polarity across the cell reverses, each of said protection networks comprising a normally conductive transistor having base, collector, and emitter electrodes, and a normally nonconductive semiconductor diode, means connecting the said cell individually associated with each of said protection networks to the emitter-collector path of said transistor of the said protection network associated therewith in each of said plurality of said protection networks, means connecting the emitter-base path of said transistor in each of said plurality of protection networks to said individual cell associated therewith so that the emitter-collector path of said transistor is normally conductive in response to the potential across said cell and nonconductive when the potential across said cell falls below a predetermined magnitude greater than the magnitude at which polarity reversal occurs, and means connecting in each of said plurality of protection networks said normally nonconductive diode in parallel with, and in the same forward conductivity direction as, the emitter-collector path of said transistor to render said diode conductive in the forward conductivity direction before the emitter-collector path of said transistor becomes nonconductive so as to provide a bypass path around said cell before the potential across said cell reaches said predetermined magnitude.

2. A cell protection network for a cell in a series string of cells, said cell being subject to overdischarge destruction if the polarity across said cell reverses, a utilization circuit, sensing means responsive to the potential of said cell to vary the potential across said sensing means in proportion to the potential of said cell, means serially connecting said cell, said sensing means, and said utilization circuit, and bypass means responsive to the potential across said sensing means and said cell connected across the series combination of said sensing means and said cell to provide a bypass path around said cell and said sensing means when the difference in the potential between said sensing means and said cell reaches a magnitude predetermined to initiate conduction through said bypass means prior to polarity reversal across said cell.

3. A cell protection network for a cell in a series string of cells, said cell being subject to overdischarge destruction if the polarity across said cell reverses, first and second semiconductor switching devices, a utilization circuit, means serially connecting said first semiconductor switching device with said cell and said utilization circuit, said first switching device being normally conductive in response to the potential across said cell and nonconductive whenever the potential across said cell falls below a magnitude predetermined to occur prior to polarity reversal across said cell, and means connecting said second normally nonconductive switching device across the series combination of said cell and said first switching device to render said second switching device conductive before said first switching device is rendered nonconductive by said cell potential falling below said predetermined magnitude, whereby said cell in said series string of cells is bypassed and removed from the series string prior to destructive discharge.

4. A cell protection network for a cell in a series string of cells, said cell being subject to overdischarge destruction if the polarity across said cell reverses, a normally conductive transistor having base, collector, and emitter electrodes, a normally nonconductive semiconductor diode, a utilization circuit, means serially connecting the emitter-collector path of said transistor with said cell and said utilization circuit, means connecting the emitter-base path of said transistor to said cell so that the emitter-collector path of said transistor is normally conductive in response to the potential across said cell and nonconductive whenever the potential across said cell falls below a predetermined magnitude greater than the magnitude at which cell polarity reversal occurs, and means connecting said normally nonconductive diode across the series combination of the emitter-collector path of said transistor and said cell to render said diode conductive in the forward conductivity direction before the emitter-collector path of said transistor becomes nonconductive due to the potential of said cell falling below said predetermined potential, said diode being poled to be conductive in the same forward conductivity direction as the emitter-collector path of said transistor.

5. A cell protection network for a cell in a series string of cells, said cell being subject to overdischarge destruction if the polarity across said cell reverses, first and second semiconductor diodes, a utilization circuit, means serially connecting said first diode in the forward conductivity direction between said utilization circuit and said cell, said first diode being normally conductive in response to the potential across said cell and nonconductive whenever the potential across said cell falls below a predetermined magnitude greater than the magnitude at which cell polarity reversal occurs, and means connecting said normally nonconductive second diode in parallel with the series combination of said first diode and said cell to render said second diode conductive when said first diode becomes nonconductive due to the potential of said cell falling below said predetermined potential, said second diode being poled to be conductive in the same forward conductivity direction as said first diode.

6. A cell protection network for a cell in a series string of cells, said cell being subject to overdischarge destruction if the polarity across said cell reverses, a utilization circuit, first and second semiconductor diodes having different forward conductivity threshold voltages, the forward threshold voltage of said second diode being less than the forward threshold voltage of said first diode, means serially connecting said first diode in the forward conductivity direction between said utilization circuit and said battery cell, said first diode being normally conductive in response to the potential across said cell and nonconductive whenever the potential across said cell falls below a predetermined magnitude greater than the magnitude at which cell polarity reversal occurs, and means connecting said normally nonconductive second diode across the series combination of said first diode and said cell so that said second diode is conductive before said first diode becomes nonconductive due to the potential of said battery cell falling below said predetermined magnitude, said second diode being poled to be conductive in the same forward conductivity direction as said first diode.

References Cited

UNITED STATES PATENTS

| | | | |
|---|---|---|---|
| 2,624,033 | 12/1952 | Jacquier | 320—53 |
| 3,044,023 | 7/1962 | Floyd | 331—59 |
| 3,189,788 | 6/1965 | Cady | 307—66 X |
| 3,213,345 | 10/1965 | Loftus | 320—51 X |
| 3,221,239 | 11/1965 | Langer et al. | 320—17 |
| 3,302,091 | 1/1967 | Henderson | 320—48 |

JOHN F. COUCH, *Primary Examiner.*

S. WEINBERG, *Assistant Examiner.*